Patented Apr. 22, 1952

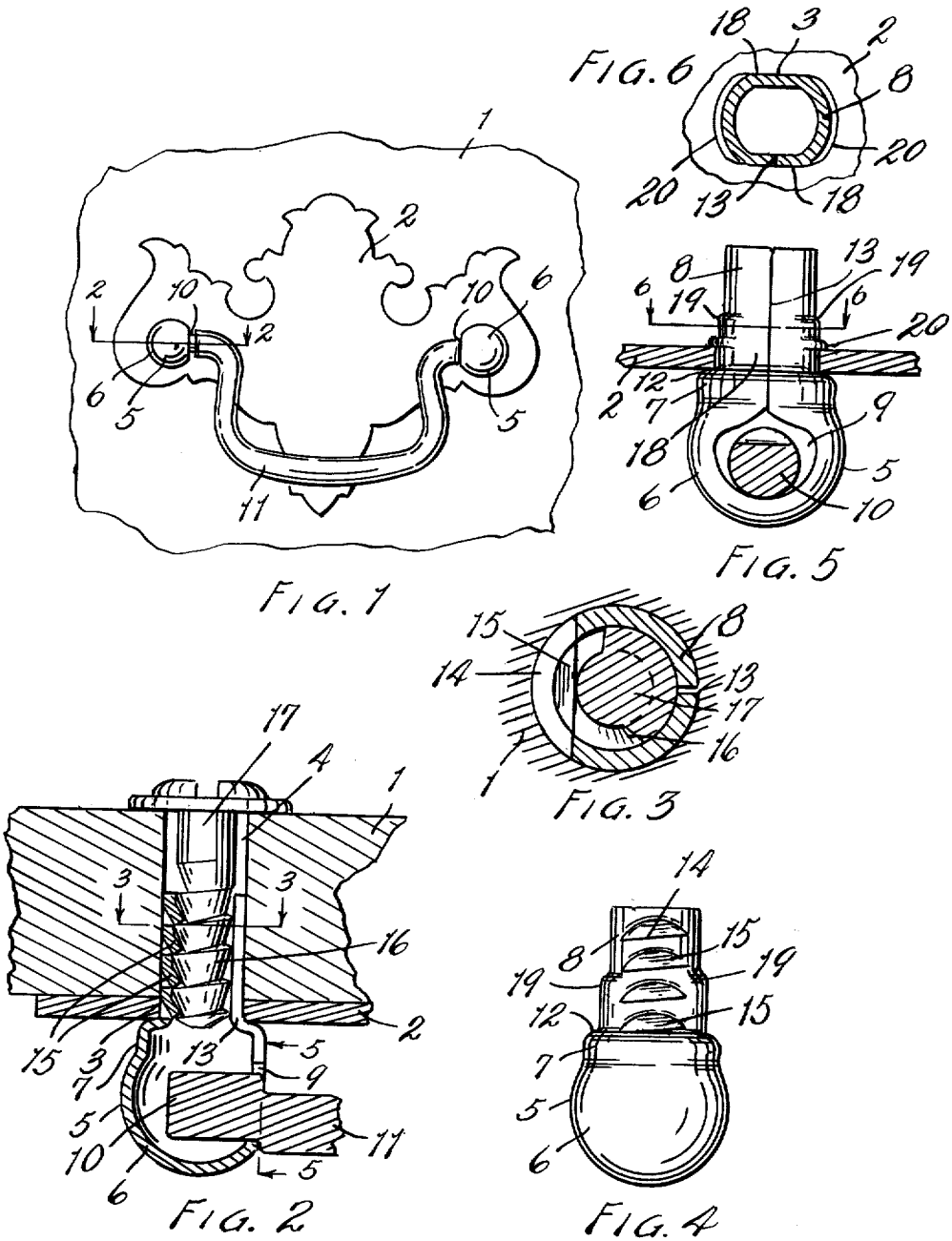

2,594,027

UNITED STATES PATENT OFFICE 2,594,027

MOUNTING STUD FOR DRAWER PULL HANDLES

Gerald V. Jakeway, Grand Rapids, Mich., assignor to Keeler Brass Company, Grand Rapids, Mich.

Application December 27, 1948, Serial No. 67,333

2 Claims. (Cl. 16—126)

1

This invention relates to improvements in mounting stud for drawer pull handle.

The main objects of this invention are:

First, to provide a drawer pull in which the parts may be formed of thin sheet metal and at the same time have the required strength for sustaining the stresses to which they are subjected in installation and use.

Second, to provide a mounting stud for drawer pulls which may be formed of a single piece of thin sheet metal and is adapted to receive an attaching screw without the necessity of a thread cutting die operation, the thread lugs or segments being formed without materially weakening the stud or detracting from the load carrying capacity thereof.

Third, to provide a mounting stud for drawer pulls and the like which is attractive in appearance and at the same time may be formed entirely by die shaping and forming operations.

Objects relating to details and economies of the invention will appear from the description to follow. The invention is defined and pointed out in the claims.

A preferred embodiment of the invention is illustrated in the accompanying drawing, in which:

Fig. 1 is a front elevational view of a drawer pull embodying my invention.

Fig. 2 is an enlarged fragmentary view mainly in section on a line corresponding to line 2—2 of Fig. 1.

Fig. 3 is a transverse sectional view through the stem of the mounting stud and the buttress thread screw cooperating therewith on a line corresponding to line 3—3 of Fig. 2.

Fig. 4 is an enlarged elevational view looking from the left of Fig. 3 with the screw omitted.

Fig. 5 is a view of the pull mounting stud and the handle element cooperating therewith, the latter being in section on line 5—5 of Fig. 2.

Fig. 6 is a fragmentary view sectioned on line 6—6 of Fig. 5.

Referring to the drawing, 1 represents the front of a drawer or the like. The escutcheon plate 2 is of suitable design and is provided with a hole 3 registering with the bore 4 in the member 1. The handle or pull mounting stud of my present invention is formed of a single piece of sheet metal designated generally by the numeral 5, and comprises an integral head portion 6, a neck portion 7, and a stem portion 8. The head portion is generally spherical in form and is provided with a side opening 9 receiving the pintle 10 of the handle 11.

2

The neck portion 7 is cylindrical and merges into the head. The stem portion 8 is tubular and of less diameter than the neck portion and merges into it in the annular shoulder 12. The stem and neck portions have longitudinal slits 13 therein which open to the bottom of the opening 9 in the head, desirably centrally thereof, as best shown in Fig. 5.

Opposite the slit 13 the wall of the stem has a plurality of longitudinally spaced slits 14 formed therein, portions of the wall of the stem adjoining these slits being deflected inwardly to provide a series of thread engaging lugs or segments 15. These lugs are spaced to correspond to the pitch of the threads 16 of the buttress thread screw 17. As shown in Fig. 2, the surface of the threads 16 facing the head of the screw project radially outwardly from the axis of the screw in a direction substantially at right angles to said axis to provide a supporting surface for the thread engaging lugs 15 when the screw is turned into the stem. This tends to prevent the lugs being wedged outwardly when the screw is turned inwardly.

It is frequently desirable that the studs, handle and escutcheon plate be assembled as a unit so that in installing it is merely necessary to insert the studs in suitably spaced bores or holes in the part on which the fixture is to be mounted and insert the screws from the inner side thereof. In this preferred embodiment the holes 3 in the escutcheon plate are not circular, that is, they are flattened on opposite sides as best shown in Fig. 6. The inner portion of the stem is correspondingly flattened at 18. The stem in this embodiment has opposed enlargements 19 which are staked or upset at 20 to secure the stem to the escutcheon plate. However, this does not affect the thread engaging lugs or the formation thereof as they extend to the shoulder of the neck as shown in Fig. 4.

The slits 14 are straight slits and when the lugs are struck in below the slits their ends merge circumferentially integrally into the wall of the stud beyond the ends of the slits so that there are no points of undue stress on the material or tear points, the lugs being supported on their under sides throughout their full length. By thus forming the lugs the die upkeep is minimized.

Applicant is familiar with the drawer pull illustrated in the Keeler Patent 1,947,942, issued February 20, 1934, the present invention being an adaptation of and in several respects an improvement upon the structure of that patent. Among the features of improvement is the economy of manufacture as a thread cutting operation is not required. A further advantage is that I am able to utilize thin sheet metal stock which is easier to form with less wear on the dies, and the thread engaging lugs can be formed during the dieing and forming steps or operation. In addition, buttress thread screws may be used with relatively deep stem thread lug engaging surfaces and the possibility or likelihood of the stem expanding sufficiently to disengage from the threads is minimized, even where the opening in the escutcheon plate and the support on which the handle is mounted are larger than the diameter of the stem.

I have illustrated and described my invention in a highly practical embodiment thereof. I have not attempted to illustrate or describe various modifications and adaptations which I contemplate as it is believed this disclosure will enable those skilled in the art to embody or adapt my invention as may be desired for particular types of handles for mounting on different types of furniture and the like.

Having thus described my invention what I claim as new and desire to secure by Letters Patent is:

1. A mounting stud for drawer pull handles and the like of thin sheet metal and comprising an integral head and stem, the head constituting means for connection of a handle to the stud, the stem being tubular, the wall of the stem having longitudinally spaced parallel slits therethrough on one side of the stem, said slits in the direction of their lengths being inclined relative to the axis of the stem, the wall portion of the stem between each two adjacent slits being inclined inwardly toward the axis of the stem, the inward inclination of said wall portion commencing from substantially adjacent the slit more distant from the head and terminating at the slit closer the head to provide a thread engaging lug.

2. In a drawer pull, a stud comprising a head and a stem of integral sheet metal, said head constituting means for connection of a handle element to the stud, the stem being tubular and having a plurality of longitudinally spaced parallel slits through the wall thereof on one side of the stem, the slits being inclined from end to end thereof relative to the axis of the stem, the stem wall adjacent each slit on the side of the slit more distant from the head being inclined inwardly of the stem to provide a plurality of thread engaging lugs on one side of the stem, the inward inclination of the stem wall commencing in spaced relation from the slit and terminating at the slit, said lugs at the inclined end portions of the slits being circumferentially integrally continuous with the wall of the stem beyond the ends of the slits.

GERALD V. JAKEWAY.

REFERENCES CITED

The following references are of record in the file of this patent:

UNITED STATES PATENTS

| Number | Name | Date |
|---|---|---|
| 242,770 | Griswold | June 14, 1881 |
| 259,798 | Blackham | June 20, 1882 |
| 1,238,695 | Mumford | Aug. 28, 1917 |
| 1,514,928 | Rabezzana | Nov. 11, 1924 |
| 1,947,942 | Keeler | Feb. 20, 1934 |
| 2,172,258 | Place | Sept. 5, 1939 |
| 2,200,227 | Olson | May 7, 1940 |